Patented June 10, 1952

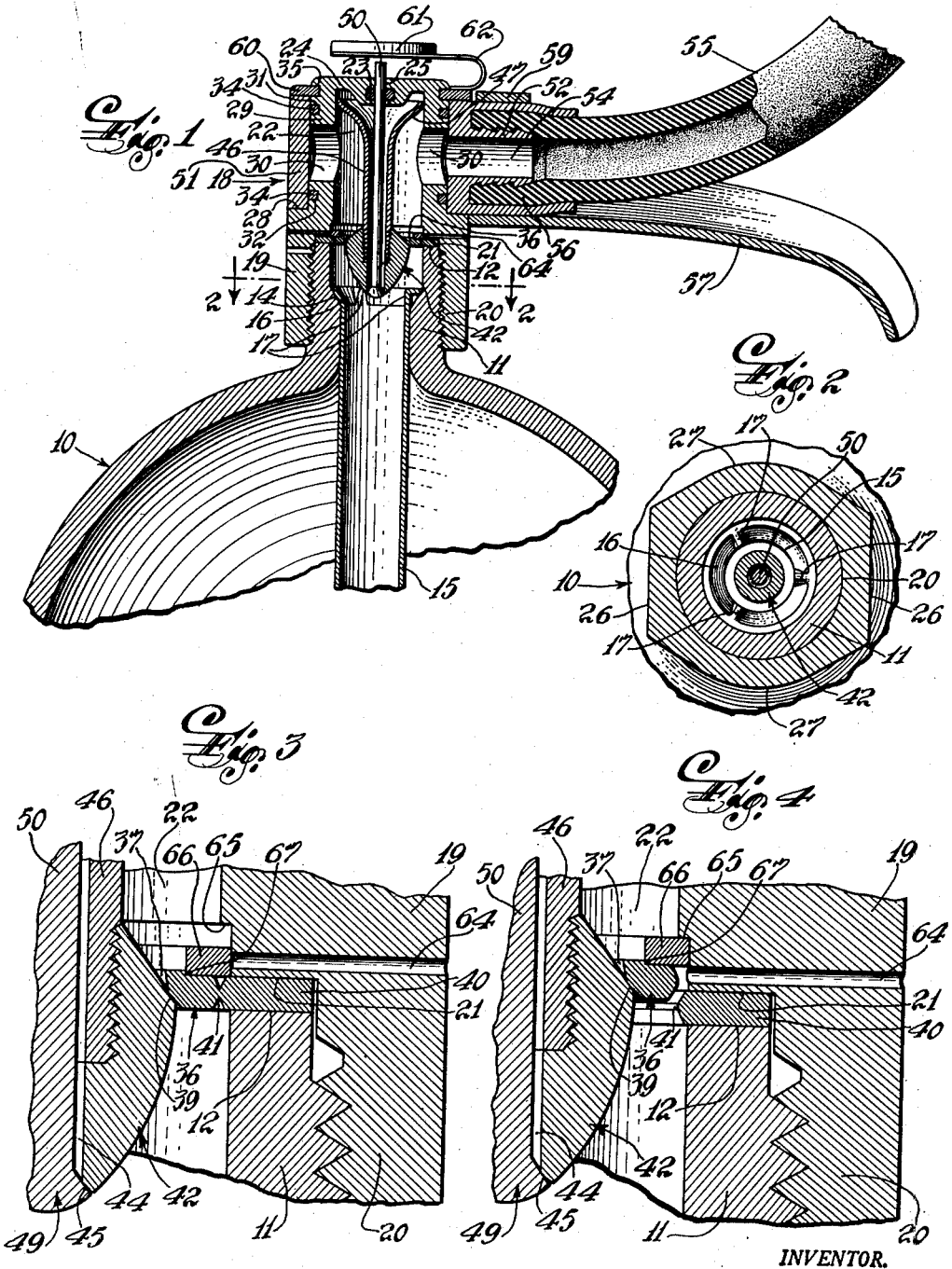

2,599,593

UNITED STATES PATENT OFFICE 2,599,593

VALVE

John H. Stroop, New York, N. Y., assignor to Specialties Development Corporation, Belleville, N. J., a corporation of New Jersey Application January 31, 1947, Serial No. 725,660

3 Claims. (Cl. 137—69)

The present invention relates to valves for controlling the discharge of fluid medium stored under pressure, such as compressed or liquefied gas.

More particularly, the present invention aims to provide a valve of the foregoing type which is constructed of a minimum number of simple parts, is light in weight and is compact in design, can be manufactured with a minimum of operations readily performed by machines, and can be rapidly assembled and secured to containers or conduits by unskilled labor.

Accordingly, an object of the present invention is to provide a valve having the foregoing characteristics which embodies means for effecting pressure operation thereof.

Another object is to provide such a valve which prevents recoil of the source of fluid medium if the medium is discharged while the valve is partly assembled.

A further object is to provide such a valve which is adapted for use in connection with inflation or other emergency apparatus where discharge, due to excessive pressure of fluid medium, through the main discharge outlet is prevented.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein:

Figure 1 is a vertical sectional view taken axially through a valve embodying the present invention, shown applied to a container for storing fluid medium under pressure.

Figure 2 is a sectional view taken along the line 2—2 on Figure 1, illustrating a detail of the valve.

Figure 3 is an enlarged fragmentary sectional view, illustrating safety discharge means prior to operation thereof.

Figure 4 is a view similar to Figure 3, illustrating the safety discharge means after operation thereof.

Referring to the drawing and more particularly to Figure 1 thereof, there is shown a source of fluid medium under pressure, such as a container 10 having an exteriorly threaded outlet or nipple portion 11, an annular sealing zone 12 at the free end of the outlet, and an annular shoulder 14 at the interior of the outlet. A syphon tube 15 is positioned in the container having a flange 16 seated on the shoulder 14, which flange is formed with a plurality of circumferentially spaced inwardly extending projections 17 (Figure 2), the function of which will be described hereinafter.

A valve 18 is secured to the container 10, comprising a valve body 19 having an axial bore provided with a threaded zone 20 at the lower portion thereof for cooperation with the threaded outlet 11, a downwardly facing annular internal shoulder 21 above the zone 20, a piston cylinder portion 22 at the upper portion of the valve body extending from the shoulder 21 to a wall 24 closing the upper end of the bore and formed with a central aperture 25 wherein a gasket 23 is positioned.

The lower exterior portion of the valve body has a pair of opposite substantially flat parallel walls 26 and a pair of opposite substantially arcuate walls 27 (Figure 2), the walls 26 and 27 extending from the lower end of the valve body to an external shoulder 28 positioned in a plane slightly above the internal shoulder 21.

The upper exterior portion 29 of the valve body is substantially cylindrical and is provided with a pair of radially extending opposed main outlets or discharge ports 30 in fluid flow communication with the cylinder portion 22 of the bore of the valve body, an annular groove 31 above the ports 30 and another annular groove 32 below the ports 30, the grooves 31 and 32 having annular gaskets 34 positioned therein. A third annular groove 35 is provided between the groove 31 and the upper edge of the valve body. Preferably, the ports 30 are above and in vertical alignment with the flat walls 26 of the valve body.

At the interior of the valve, there is provided a combined valve seat and safety disc 36 which comprises an annular member having a central aperture or main valve port 37, a downwardly facing main valve seat 39 surrounding the aperture 37, and a marginal portion 40 which is secured between the sealing zone 12 and the shoulder 21 to seal the container, and a weakened annular zone 41 between the marginal portion 40 and the valve seat 39 for facilitating rupture of the disc resulting in inner and outer annular sections (Figure 4).

A main valve member 42 formed of a suitable material is adapted to be urged against the valve seat 39 due to the pressure of the medium in the container and has an axial bore or passage 44 formed with a pilot valve seat 45 at the lower end thereof.

A main valve stem 46, in the form of a tubular member, has its lower end threaded in the main valve member in fluid flow communication with the passage 44 and has its upper end flared outwardly to form a piston 47 disposed in the cylinder 22. The valve stem 46 may be formed from a thin metallic tube having its lower end threaded and its upper end expanded. As will be noted, the upper end of the piston is spaced slightly from the underside of the end wall 24, the purpose of which will become apparent hereinafter.

A pilot valve member 49 is adapted to be urged against the seat 45 due to the pressure of the medium in the container and has a stem 50 extending through the passage 44 of the main valve member 42, the main valve stem 46, the gasket 23 and the aperture 25 to the exterior of the valve body.

A cylindrical coupling ring 51 surrounds the cylindrical upper portion 29 of the valve body in sealing relation with the gaskets 34 and has its lower edge supported on the shoulder 28 and has its upper edge disposed slightly below the groove 35. In order to conduct the pressure medium discharged through the valve to a point of use, the ring has a nipple 52 provided with an outlet or passage 54 therein, in registry with one of the ports 30 and adapted to receive one end of a hose or conduit 55 which is secured to the nipple by a tubular extension 56 spaced from and surrounding the nipple 52 herein shown as being integral with the ring 51.

A laterally extending carrying handle 57 is connected to the coupling ring by means of a band portion 59 secured about the tubular section 56. The lower side of the band portion 59 has a straight edge positioned to cooperate with one of the flat walls 26 of the valve body 19 whereby the passage 54 is placed in alignment with one of the ports 30.

The coupling ring 51 is secured to the valve body by a split ring 60 adapted to be snapped into the groove 35 and overlie the upper edge of the coupling ring. If desired, a push button 61 may be provided for moving the pilot valve stem downwardly to effect operation of the valve. This push button is carried by the split ring 60 and is connected thereto by a resilient U-shaped strip 62.

While the invention has been described in connection with a valve for a portable container, it will be appreciated that valves embodying the present invention may be used on containers of fixed systems or the like and for pipes or conduits for conducting fluid medium under pressure. It will also be understood that pilot valve stem operating means other than the push button 61 may be employed, including means for controlling operation of the valve from a remote location.

Referring to Figures 3 and 4, more particularly, there is shown means for preventing discharge by way of the main outlet ports 30 in the event the safety disc 36 bursts due to excessive pressure of the medium at the source. To accomplish this, the valve body is provided with one or more safety outlets 64 just above the shoulder 21 which extend radially from the lower portion of the cylinder 22 to the atmosphere, and an annular inwardly extending shoulder 65 above the outlet 64. An annular sealing ring 66 is supported on the inner portion of the disc 36 and may be held in position by an annular rib 67 on the disc 36 to close the outlet 64 and prevent the entry of dirt or foreign substance into the valve.

As shown in Figure 4, when the disc 36 bursts, the inner portion which has been broken away from the marginal portion 40 secured between the sealing zone 12 and the shoulder 21 is moved upwardly by the main valve member, whereby the sealing ring 66 is carried upwardly and is urged against the shoulder 65. Since the shoulder limits the upward movement of the ring 66, the broken away portion of the disc is forced against the ring to form a pressure tight seal adjacent the shoulder 65 to prevent the medium from flowing into the upper part of the valve body where the outlet ports are located. When the ring 66 is carried upwardly, the outlet 64 is uncovered permitting the pressure medium to be discharged to the atmosphere by way of the safety outlet 64.

By reason of the piston 47 of the main valve stem 46 being normally spaced from the end wall 24, the broken away portion of the disc and the main and pilot valve assembly are adapted to move upwardly to enable the sealing ring to be forced against the shoulder.

In order to operate the valve illustrated herein, the pilot valve stem 50 is moved downwardly to unseat the pilot valve member 49 and pressure medium passes through the passage 44 and the main valve stem 46 to the upper end of the cylinder 22 and is expanded against the working side of the piston 47 to move the piston downwardly and effect unseating of the main valve member 42. When the latter is unseated, the medium in the container is conducted through the valve to the main outlet port in registry with the outlet 54 to which the hose is attached. Downward movement of the main valve member is limited by the projections 17 on the syphon tube which serve as stops and prevent the valve member from closing the syphon tube opening.

In the event the valve is assembled on a container of fluid medium under pressure before the coupling ring 51 is attached and the valve is operated accidentally, the medium will be discharged through the two radially extending opposed ports 30 which serve to prevent recoil of the container. Likewise, by providing two opposed safety discharge outlets 64, recoil is prevented upon safety discharge.

From the foregoing description, it will be seen that the present invention provides a practical valve for dispensing fluid medium under pressure. The parts of the valve are extremely simple in construction and can be readily manufactured at a low cost by automatic or semi-automatic machines. The valve is readily assembled as a unit comprising the valve body, the seal and safety disc, and the main and pilot valve assembly, and this unit can be readily handled and applied to a container or conduit. The coupling ring, hose and handle assembled can be thereafter mounted on the valve body in a convenient manner.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A valve comprising a cylindrical valve body having an axial bore, a wall at one end of said body provided with an aperture, a connecting section and an external shoulder adjacent the other end of said body, said body in the cylindrical portion thereof being provided with a pair of opposed radial ports in communication with said bore and being provided with an annular groove intermediate said end wall and said ports; a valve seat between said ports and said connecting section; valve means for said seat including an operating stem slidably mounted in said aperture and extending outwardly therethrough; a coupling ring formed with a bore through which said cylindrical portion extends and being seated on said shoulder, said ring having an outlet port in registry with a selected one of said radial ports; a ring member extending into said groove and overlying said coupling ring to secure the same to said valve body; and a resilient member having one end secured to said ring member and having its other end adjacent the outwardly extending end of said stem for effecting movement thereof.

2. A valve comprising a cylindrical valve body having an axial bore, a wall at one end of said body provided with an aperture, a connecting section and an external shoulder adjacent the other end of said body, said body in the cylindrical portion thereof being provided with a pair of opposed radial ports in communication with said bore and being provided with an annular groove intermediate said end wall and said ports; a valve seat between said ports and said connecting section; valve means for said seat including an operating stem slidably mounted in said aperture and extending outwardly therethrough; a coupling ring formed with a bore through which said cylindrical portion extends and being seated on said shoulder, said ring having an outlet port in registry with a selected one of said radial ports; a ring member extending into said groove and overlying said coupling ring to secure the same to said valve body; a U-shaped spring member having one end secured to said ring member and having its other end adjacent the outwardly extending end of said stem; and a button on the last mentioned end of said spring member for effecting movement thereof to operate said stem.

3. A valve comprising a cylindrical valve body having an axial bore, a wall at one end of said body provided with an aperture, a connecting section and an external shoulder adjacent the other end of said body, said body in the cylindrical portion thereof being provided with a pair of opposed radial ports in communication with said bore and being provided with an annular groove intermediate said end wall and said ports; a valve seat between said ports and said connecting section; valve means for said seat including an operating stem slidably mounted in said aperture and extending outwardly therethrough; a coupling ring formed with a bore through which said cylindrical portion extends and being seated on said shoulder, said ring having a radial nipple formed with an outlet port in registry with a selected one of said radial ports and having a sleeve surrounding said nipple and cooperating therewith to secure a flexible hose thereon; a ring member extending into said groove and overlying said coupling ring to secure the same to said valve body; and a hand member formed at one end with a band portion encircling said sleeve and being secured thereon.

JOHN H. STROOP.

REFERENCES CITED

The following references are of record in the file of this patent:

UNITED STATES PATENTS

| Number | Name | Date |
|---|---|---|
| 312,077 | Bowen | Feb. 10, 1885 |
| 751,677 | Nethery | Feb. 9, 1904 |
| 841,093 | Mueller | Jan. 8, 1907 |
| 981,787 | Montgomery | Jan. 17, 1911 |
| 1,149,594 | O'Malley | Aug. 10, 1915 |
| 1,266,192 | Anthony | May 14, 1918 |
| 1,269,213 | Power | June 11, 1918 |
| 1,333,506 | Perry | Mar. 9, 1920 |
| 1,535,405 | Ernst | Apr. 28, 1925 |
| 1,576,255 | Szekel | Mar. 9, 1926 |
| 1,743,413 | Weatherhead | Jan. 14, 1930 |
| 1,848,261 | McIntyre | Mar. 8, 1932 |
| 1,854,051 | McAndrew | Apr. 12, 1932 |
| 1,873,735 | Bowman | Aug. 23, 1932 |
| 1,898,899 | Rowley | Feb. 21, 1933 |
| 1,982,514 | Hansen | Nov. 27, 1934 |
| 2,063,821 | McKenzie | Dec. 8, 1936 |
| 2,080,602 | Chamberlain | May 18, 1937 |
| 2,273,856 | Freygang | Feb. 24, 1942 |

FOREIGN PATENTS

| Number | Country | Date |
|---|---|---|
| 112,003 | Great Britain | Dec. 20, 1917 |